United States Patent
Kogler et al.

(10) Patent No.: US 9,997,946 B2
(45) Date of Patent: Jun. 12, 2018

(54) BATTERY CHARGING SYSTEM WITH FEEDBACK CONTROL

(71) Applicant: Dialog Semiconductor (UK) Limited, London (GB)

(72) Inventors: Manfred Kogler, Groebenzell (DE); Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 245 days.

(21) Appl. No.: 14/966,009

(22) Filed: Dec. 11, 2015

(65) Prior Publication Data

US 2017/0005503 A1 Jan. 5, 2017

(30) Foreign Application Priority Data

Jul. 2, 2015 (DE) .................... 10 2015 212 403

(51) Int. Cl.
*H01M 10/44* (2006.01)
*H01M 10/46* (2006.01)
*H02J 7/00* (2006.01)

(52) U.S. Cl.
CPC .................... *H02J 7/007* (2013.01)

(58) Field of Classification Search
CPC .... H02J 7/355; H02J 2007/0062; H02J 7/007; H02J 2007/0095
USPC .................... 320/107, 111, 114, 128, 135
See application file for complete search history.

(56) References Cited

U.S. PATENT DOCUMENTS

| | | |
|---|---|---|
| 2007/0053212 A1 | 3/2007 | Vieira Formenti |
| 2008/0158915 A1* | 7/2008 | Williams ............... H02M 3/07 363/21.06 |
| 2009/0261786 A1 | 10/2009 | Hsu et al. |
| 2011/0221604 A1 | 9/2011 | Johnson |
| 2014/0368159 A1 | 12/2014 | Han et al. |
| 2015/0015088 A1 | 1/2015 | Petersen |

OTHER PUBLICATIONS

German Office Action and English Translation 10 2015 212 403.7, dated Feb. 29, 2016, Dialog Semiconductor (UK) Limited.
"MediaTek Announces Pump Express(TM) Fast-Charging for Mobile Devices," by Hsinchu, PRNewswire, Feb. 28, 2014, found: http://www.prnewswire.com/news-releases/mediatek-announces-pu . . .

* cited by examiner

*Primary Examiner* — Edward Tso
(74) *Attorney, Agent, or Firm* — Saile Ackerman LLC; Stephen B. Ackerman

(57) ABSTRACT

A charging system for a battery of an electronic device is described. The charging system comprises an adapter configured to derive a transfer current at a transfer voltage from a power source. Furthermore, the charging system comprises a battery charger configured to charge a battery of the electronic device with a battery current at a battery voltage using the transfer current at the transfer voltage. In addition, the charging system comprises power transmission means configured to transmit the transfer current at the transfer voltage to the battery charger. In addition, the charging system comprises communication means configured to transmit feedback information which is indicative of the battery voltage and/or battery current from the battery charger to the adapter. The adapter is configured to set the transfer voltage and/or transfer current in dependence of the feedback information.

26 Claims, 3 Drawing Sheets

BATTERY CHARGING SYSTEM WITH FEEDBACK CONTROL

TECHNICAL FIELD

The present document relates to a system and a method for charging a battery in a power efficient manner.

BACKGROUND

High voltage (HV) battery chargers, with an input voltage Vin in the range of 20V, typically make use of inductor based power converters which achieve conversion efficiency in the range of about 90%. Such a relatively low efficiency is due to the fact that the efficiency of an inductive step-down power converter is optimum for output voltages Vout which are only slightly lower than the input voltage Vin, i.e. for conversion ratios Vout/Vin~1.

The battery or output voltage is typically Vout=3.6V (i.e. <4.2V) and the input voltage Vin (also referred to herein as the transfer voltage) from an external power supply may be up to 20V. As a result of this, the Vin/Vout conversion ratio is relatively high and the efficiency is reduced. One parameter affecting the efficiency of an inductive step-down converter is the switching frequency, wherein the efficiency of the power converter is typically increased, when the switching frequency is reduced. On the other hand, a reasonable current ripple at relatively low switching frequencies typically requires inductors with relatively high inductance. The size of an inductor typically increases with increasing inductance. Hence, the use of inductors with relatively high inductance is typically incompatible with modern portable electronic devices such as thin tablet PCs or smartphones. Consequently, battery chargers for portable electronic devices usually make use of relatively low inductance coils, thereby triggering relatively high switching frequencies and by that limiting the achievable maximum conversion efficiency of the power converter of the battery charger.

SUMMARY

The present document addresses the technical problem of providing a power efficient and compact system for charging the battery of an electronic device. The technical problem is solved by the independent claims. Furthermore improvements are described within the dependent claims. According to an aspect, a charging system for a battery of an electronic device is described. The charging system comprises an adapter which is configured to derive power at a transfer voltage from a power source. In particular, the adapter may be configured to derive a transfer current at a transfer voltage. By way of example, the power source may provide AC power at an AC voltage. On the other hand, the transfer voltage is typically a DC voltage and the transfer current is typically a DC current. As such, the adapter may comprise an AC/DC converter for deriving the power at the DC transfer voltage from the AC power that is provided by the power source. The adapter may comprise a wall plug adapter, i.e. the adapter may comprise a power plug for coupling the adapter with a wall socket, e.g. the wall socket of a mains supply.

Furthermore, the charging system comprises a battery charger which is configured to charge a battery of the electronic device with a battery current at a battery voltage using the power at the transfer voltage, in particular, using the transfer current at the transfer voltage. The battery current may be regulated to a pre-determined target charging current (e.g. to a constant target charging current or a target charging current that follows a pre-determined charging curve). The battery charger may be implemented as part of the electronic device. Typically, the adapter and the battery charger are implemented in separate physical units, notably within separate integrated circuits (ICs).

The charging system further comprises power transmission means which are configured to transmit the power at the transfer voltage (i.e. the transfer current at the transfer voltage) to the battery charger. In particular, the power transmission means may comprise a charging cable, notably a USB (Universal Serial Bus) charging cable, for transmitting the power in a conductive manner. Alternatively or in addition, the power transmission means may comprise a wireless power transmission unit (e.g. as part of the adapter) which is configured to generate an electromagnetic charging field using the power at the transfer voltage (i.e. the transfer current at the transfer voltage). The wireless power transmission unit may comprise a transmission coil for this purpose. Furthermore, the power transmission means may comprise a wireless power reception unit (e.g. as part of the battery charger) configured to derive power at the transfer voltage (i.e. the transfer current at the transfer voltage) from the electromagnetic charging field. The wireless power transmission unit may comprise a reception coil for this purpose.

In addition, the charging system comprises communication means configured to transmit feedback information which is indicative of the battery voltage and/or the battery current from the battery charger to the adapter. In particular, the battery charger may comprise a transmission communication module configured to transmit the feedback information over a communication channel. Furthermore, the adapter may comprise a receiver communication module configured to receive the feedback information via the communication channel. The communication channel may comprise an electrical wire of a charging cable which is used for conducting the power or the transfer current at the transfer voltage from the adapter to the battery charger. Alternatively or in addition, the communication channel may comprise a radio frequency link, such as a Bluetooth link, a WLAN link, a UMTS link and/or an LTE link.

The adapter is configured to set the transfer voltage and/or the transfer current in dependence of the feedback information. In particular, the adapter may be configured to either set the transfer voltage or the transfer current. As a result of this, power may be provided to the battery charger such that the efficiency of the battery charger may be increased (e.g. maximized) and/or such that power dissipation of the battery charger may be decreased (e.g. minimized). Consequently, a power efficient (and possibly size efficient) charging system may be provided.

In particular, the adapter may be configured to set (e.g. regulate) the transfer voltage such that a voltage conversion ratio which is to be applied within the battery charger to charge the battery with a battery current at the battery voltage is an integer n equal to or greater than 1. As a result of this, power efficiency may be further increased.

The battery charger may comprise a current regulator that is configured to regulate the battery current for charging the battery using the power at the transfer voltage. Furthermore, the battery charger may comprise a control unit which is configured to select a charging strategy for charging the battery and which is configured to control the current regulator based on the selected charging strategy. The charging strategy may e.g. define a target charging current as a function of the state of charge (SOC) of the battery. The charging strategy may e.g. be designed to increase (e.g. maximize) the lifetime and/or the number of charging cycles of the battery. The control unit may be configured to determine the SOC of the battery. Furthermore, the control unit may be configured to determine the target charging current based on the SOC (and typically based on a pre-determined charging strategy). The target charging current may be used by the current regulator to regulate the battery current to the target charging current. This may require the battery voltage to be set to a particular value that enables a battery current which corresponds to the target charging current. By providing feedback information that is indicative of the required battery voltage to the adapter, the adapter may modify the transfer voltage as outlined in the present document, thereby increasing the power efficiency of the charging system.

In other words, the battery charger may comprise a control unit which is configured to determine a target charging current. The current regulator may be configured to derive the battery voltage in dependence of the target charging current, notably such that the battery current at the output of the current regulator corresponds to the target charging current. Hence, the battery voltage may vary over time, and by consequence varying feedback information may be provided to the adapter.

The current regulator may comprise a battery switch and/or a low drop-out (LDO) regulator. Furthermore, the current regulator may exhibit a regulator voltage drop Vrdrop. The adapter may be configured to set the transfer voltage in dependence of the regulator voltage drop Vrdrop, thereby further increasing the power efficiency of the charging system. For efficiency it is particularly beneficial to minimize Vrdrop, which is the case when the battery switch is closed (i.e. when the LDO works in bypass mode). As soon as the LDO inserts a dropout voltage from regulation, the power dissipation increases and efficiency goes down. As such, it may be beneficial to transfer the task of regulating the battery current to the adapter, which may be configured to provide a (regulated) transfer current in dependence of a required battery current.

The battery charger may comprise a power converter which is configured to perform a step-down conversion of the transfer voltage by a conversion ratio n, wherein n is an integer greater than or equal to 1. Power converters having this feature may exhibit particularly high conversion efficiencies. This is particularly the case for a power converter which comprises or which corresponds to a capacitive power converter. The adapter may be configured to set the transfer voltage in dependence of the conversion ratio n. Consequently, the power efficiency of the charging system may be further increased.

The power converter may exhibit a converter voltage drop Vcdrop. The adapter may be configured to set the transfer voltage in dependence of the converter voltage drop Vcdrop, thereby further increasing the power efficiency of the charging system.

The adapter may comprise a voltage regulator which is configured to regulate the transfer voltage in dependence of the feedback information. In particular, the transfer voltage Vin may be regulated to correspond to Vin=n×(Vbat+Vcdrop)+Vrdrop, wherein Vbat is the desired battery voltage. Alternatively or in addition, the transfer voltage may be set or regulated such that the battery voltage is derivable from the transfer voltage by the battery charger using voltage step-down conversion with a conversion ratio of n, with n being an integer equal to or greater than 1.

The adapter may be configured to limit a maximum transfer current in accordance to the current rating of the battery charger, the power converter, the power transfer path (e.g. the charging cable or the wireless power transmission means) or in accordance to a maximum battery current.

Furthermore, the adapter may be configured to provide a constant transfer current with the transfer voltage being regulated accordingly. The transfer voltage may be restricted to a maximum level that may be derived from the input voltage rating of the battery charger or that may be determined by the maximum battery voltage (plus the voltage drop in the power converter) multiplied with the conversion ratio n. Such a configuration may allow removing the battery charger or current regulator and its loss.

As such, the adapter may be configured to set (e.g. regulate) the transfer current in dependence of the feedback information, such that the battery voltage is derivable from the transfer voltage by the battery charger using (only) voltage step-down conversion with a conversion ratio of n, with n being an integer equal to or greater than 1. For this purpose the adapter may comprise a current regulator. As a result of this, the battery charger may be provided without a current regulator, thereby further increasing the efficiency of the battery charger.

The adapter may be configured to regulate the transfer voltage such that the transfer current does not exceed a pre-determined maximum transfer current. Alternatively, the adapter may be configured to regulate the transfer current such that the transfer voltage does not exceed a pre-determined maximum transfer voltage. The maximum transfer current and/or the maximum transfer voltage may be fixed. Alternatively, the maximum transfer current and/or the maximum transfer voltage may be set by the battery charger via the communication means.

According to a further aspect, an adapter for a charging system for charging a battery of an electronic device is described. The adapter comprises a receiver communication module which is configured to receive feedback information which is indicative of a battery voltage and/or a battery current that is to be used for charging the battery. In particular, the battery voltage may be used by a current regulator of a corresponding battery charger for setting a battery current in accordance to a pre-determined target charging current. The battery voltage may vary over time, in order to provide a battery current which is set (e.g. regulated) in accordance to a pre-determined target charging current (e.g. a constant target charging current).

Furthermore, the adapter comprises a voltage regulator and/or current regulator which are configured to derive power (e.g. a transfer current) at a transfer voltage from a power source, in dependence of the feedback information. In particular, the transfer voltage may be derived in dependence of the battery voltage which is to be set for charging the battery voltage. Alternatively or in addition, the transfer current may be derived in dependence of the battery current which is to be used for charging a battery. In view of the fact that the battery voltage and/or the battery current may vary over time, the transfer voltage and/or battery current may vary over time accordingly. In addition, the adapter comprises a power transmission interface (e.g. an appropriate plug or socket) for providing the power (e.g. the transfer current) at the transfer voltage over power transmission means (e.g. over a charging cable) to a battery charger for charging the battery.

According to another aspect, a battery charger for charging a battery of an electronic device is described. The battery charger comprises a power reception interface (e.g. an appropriate plug or socket) for receiving power (e.g. a transfer current) at a transfer voltage over power transmission means (e.g. over a charging cable). Furthermore, the battery charger may comprise a current regulator which is configured to regulate a battery current for charging the battery using the power at the transfer voltage. The battery current is to be provided at a battery voltage. In particular, the current regulator may be configured to set the voltage at the output of the current regulator such that the battery is charged with the (e.g. constant) battery current. The battery voltage may vary over time. In particular, the battery voltage may vary with the state of charge (SOC) of the battery.

The battery charger may comprise a transmission communication module which is configured to transmit feedback information indicative of the battery voltage and/or the battery current over a communication channel. As a result of this, a corresponding adapter may use the feedback information for providing the power at the transfer voltage, wherein the transfer voltage may be dependent on the feedback information (notably on the battery voltage and/or battery current which are to be used (e.g. at the output of the current regulator) for charging the battery).

According to a further aspect, a method for charging a battery of an electronic device using an adapter and a battery charger is described. The adapter and the battery charger are separate from one another. The method comprises deriving power (e.g. a transfer current) at a transfer voltage from a power source using the adapter. Furthermore, the method comprises transmitting the power (e.g. the transfer current) at the transfer voltage from the adapter to the battery charger. In addition, the method comprises charging the battery of the electronic device with a battery current at a battery voltage, wherein the battery current is derived from the power (e.g. the transfer current) at the transfer voltage using the battery charger. The method further comprises transmitting feedback information which is indicative of the battery voltage and/or battery current from the battery charger to the adapter, wherein the transfer voltage and/or the transfer current are set by the adapter in dependence of the feedback information.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As outlined above, the present document addresses the technical problem of charging the battery of an electronic device in a power and space efficient manner. In particular, it is desirable to increase the efficiency of a charging system (and notably of the power converter comprised within the battery charger of the charging system) to 95% or more, in order to decrease power dissipation within the electronic device.

Figure 1:
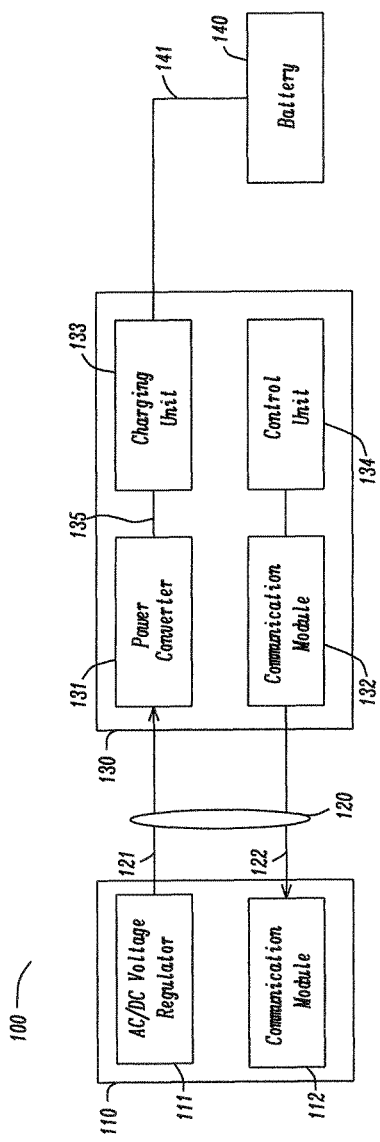
FIG. 1 shows a block diagram of an example system for charging a battery.

FIG. 1 shows a block diagram of an example charging system 100, wherein the charging system 100 comprises a wall plug adapter 110, a charging cable 120 (e.g. a USB cable) and a battery charger 130. Typically, the battery charger 130 is incorporated into an electronic device such as a smartphone or a tablet PC, in order to charge a battery 140 of the electronic device. The adapter 110 comprises an AC/DC regulator 111 (notably a voltage regulator) which is configured to generate a DC (Direct Current) transfer voltage 121 from an AC (Alternating Current) source voltage (e.g. from an AC mains voltage at e.g. 110V, 220V or 240V). The DC transfer voltage 121 is provided via the charging cable 120 to a power converter 131 of the battery charger 130, wherein the power converter 131 is configured to convert the transfer voltage 121 into a system voltage 135, wherein the system voltage 135 typically corresponds to the battery voltage Vbat 141 used for charging the battery 140 plus a drop voltage Vcdrop at the charging unit 133 (which may comprise or may be a current regulator).

The charging unit 133 (or current regulator) may be configured to provide a pre-determined battery current at a (typically varying) battery voltage 141 to the battery 140 for charging the battery 140. For this purpose, the charging unit 133 may comprise a battery switch and/or a battery regulator (e.g. a low-drop out, LDO, regulator), as well as current sense means for sensing the battery current. The charging unit 133 may be controlled using a control unit 134. In particular, the charging unit 133 may be controlled such that a battery current in accordance with a (pre-determined) target charging current is provided.

Furthermore, the charging system 100 comprises communication means which enable the battery charger 130 to communicate with the adapter 110. In particular, the communication means enable the battery charger 130 to provide feedback information to the adapter 110. Furthermore, the adapter 110 may be configured to adapt the operation of the AC/DC regulator 111 in dependence of the feedback information. The communication means comprise a communication module 132 within the battery charger 130 and a corresponding communication module 112 within the adapter 110. The feedback information may be transmitted by the communication module 132 of the battery charger 130 over the charging cable 120 (e.g. over a communication wire 122 of the charging cable 120) to the communication module 112 of the adapter 110.

The feedback information may be provided by the control unit 134 of the battery charger 130. The feedback information may be indicative or may correspond to the battery voltage 141, which is to be used by the charging unit 133 for charging the battery 140.

Using a bi-directional communication between the battery charger 130 and the adapter 110, the adapter 110 may inform the battery charger 130 during initial negotiation about its capabilities (e.g. the maximum Voltage and/or current).The adapter 110 may also send an acknowledgement to instructions received from the battery charger 130 or flag a communication error (e.g. an invalid instruction).

As indicated above, it is a goal of the present document to increase (e.g. maximize) efficiency of the battery charger 130. For this purpose, the transfer voltage 121 (which is also referred to as the input voltage of the battery charger 130)

may be set to be exactly n times the battery voltage Vbat 141 plus the drop voltage Vcdrop over the charging unit 133 and possibly plus some voltage drop Vpdrop within the power converter 131. This may be achieved by regulating the voltage at the output of the AC/DC regulator 111 in dependence of the required battery voltage Vbat 141. As illustrated in FIG. 1, the communication from the battery charger 130 to the adapter 110 may be done via wall plug communication using the charging cable 120. In particular, the battery voltage 141 and/or the required transfer voltage 121 may be communicated as feedback information to the adapter 110. The AC/DC regulator 111 may then be operated such that the required transfer voltage 121 is provided to the input of the battery charger 130.

The power converter 131 may comprise a capacitive power converter. Furthermore, the power converter 131 may be configured to provide an integer step-down conversion ratio n in a power-efficient manner, as is the case e.g. when using an appropriately designed capacitive power converter. As a result of providing an input voltage 141 to the power converter 131, which is n times the desired battery voltage 141 (typically plus voltage drops at the power converter 131 and/or the charging unit 133), the power converter 131 may be operated at an optimum operation point having maximum conversion efficiency.

It should be noted that communication between the battery charger 130 and the adapter 110 is not restricted to communication via a cable 120 (e.g. via USB wires). As shown in the charging system 200 of FIG. 2, wireless communication 222 with a wall plug adapter 110 may be performed using appropriate wireless communication modules 232, 212. Example wireless communication schemes are Bluetooth, Wireless LAN, UMTS, LTE, etc.

Furthermore, it should be noted that the charging system 200 may be configured to perform wireless power transmission 221 using a wireless power transmitter 211 at the adapter 110 and a corresponding wireless power receiver 231 at the battery charger 130. Wireless power transmission 221 typically makes use of inductors for power transmission. An example for inductive power transmission is the Qi standard.

It should be noted that for the case of n=1 the power converter 131 may be bypassed and/or removed, thereby further increasing the power efficiency of the charging system 100, 200.

As such, an integrated capacitive converter 131 may be used within the battery charger 130 to divide the input voltage 121. The capacitive converter 131 may be used in combination with a regulation loop to control the input voltage 121 dynamically to exactly n×(Vbat+Vcdrop). Alternatively or in addition, the capacitive converter 131 may be used to control a constant current which is to be provided to the battery 140. A capacitive converter 131 may achieve high efficiency as long as the conversion ratio Vin/Vout of the converter 131 is an integer ratio. A typical implementation may be a 2:1 capacitive converter. No regulation may be used within the capacitive converter 131, thereby providing optimum efficiency of the capacitive converter 131.

A further advantage of a capacitive converter 131 compared to an inductor-based power converter is the 10-1000 higher energy density of a capacitor vs. an inductor. By that the energy storage elements used within the capacitive converter 131 may be ultra-small even if the switching frequency of the capacitive converter 131 is relatively low.

Figure 2:
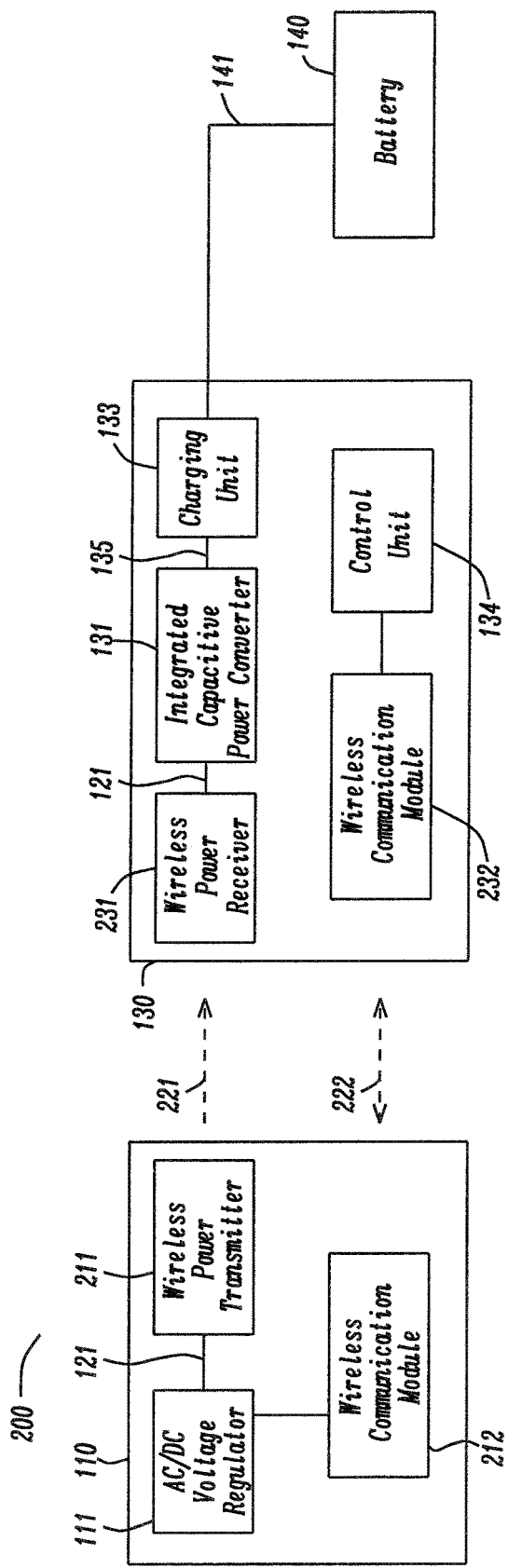
FIG. 2 shows a block diagram of another example system for charging a battery.

The charging systems 100, 200 of FIGS. 1 and 2 make use of the AC/DC regulator 111 of the adapter 110 to regulate the system voltage 135 at the input to the charging unit 133. For this purpose, feedback information that is indicative of the battery voltage Vbat 141 is provided to the adapter 110 using communication means. In particular, a (closed loop) communication between the integrated circuit (IC) of the battery charger 103 within the electronic device and the IC of the regulator 111 within the external power supply 110 (i.e. within the adapter 110) may be provided.

The loop may be "closed" at the AC/DC regulator 111 by changing the transfer voltage. It should be noted that a higher voltage may also trigger a higher current, which causes increased voltage drop in the current feeding components of the system 100. As a result, the transfer voltage at the input of the battery charger 130 may increase less than instructed to the AC/DC regulator 111. In case of configuring a constant current, the provision of such a current using the system 100 may be considered to be a loop closure. However, in case of a maximum transfer voltage, the configured current may not always be provided to the battery charger 130. The communication may be done via the charging cable 120, where several techniques may be used, such as VBUS signalling, D+/D− signalling, and/or communication over a Type C connector of the cable 120. Alternatively or in addition, the communication between the charger IC and the regulator IC within the wall plug adapter 110 may be implemented using a wireless connection. A typical application is wireless charging. The communication with the power transmitter (i.e. with the adapter 110) may be implemented via load modulation and/or through a wireless RF (radio frequency) link (Bluetooth, etc.), as is e.g. specified by the Rezence™ wireless power charging standard.

The charging systems 100, 200 of FIGS. 1 and 2 allow power conversion at high efficiency even with conversion ratios of Vin/Vout=2, 3, 4 . . . As a consequence, the transfer voltage 121 may be increased, thereby enabling the transmission of an increased amount of power using the same power cable 120 (wire/connector) at high efficiency (of e.g. 95%) and low power dissipation within the battery charger 130 (e.g. a decrease of 50%). As such, the charging systems 100, 200 enable power efficient high voltage (HV) battery charging.

As indicated above, in case of a conversion ratio Vin/Vout=1, the power converter 131 may be removed from the battery charger 130. As a result of this, the transfer voltage 121 is directly provided to the charging unit 133, which may be configured to provide a regulated battery current for charging to the battery 140. In such a case, the transfer voltage 121 is set by the regulator 111 of the adapter 110 to the battery voltage 141 plus the voltage drop across the charging unit 133. As a result of this, power dissipation and space requirements of the battery charger 120 may be further reduced.

Figure 3:
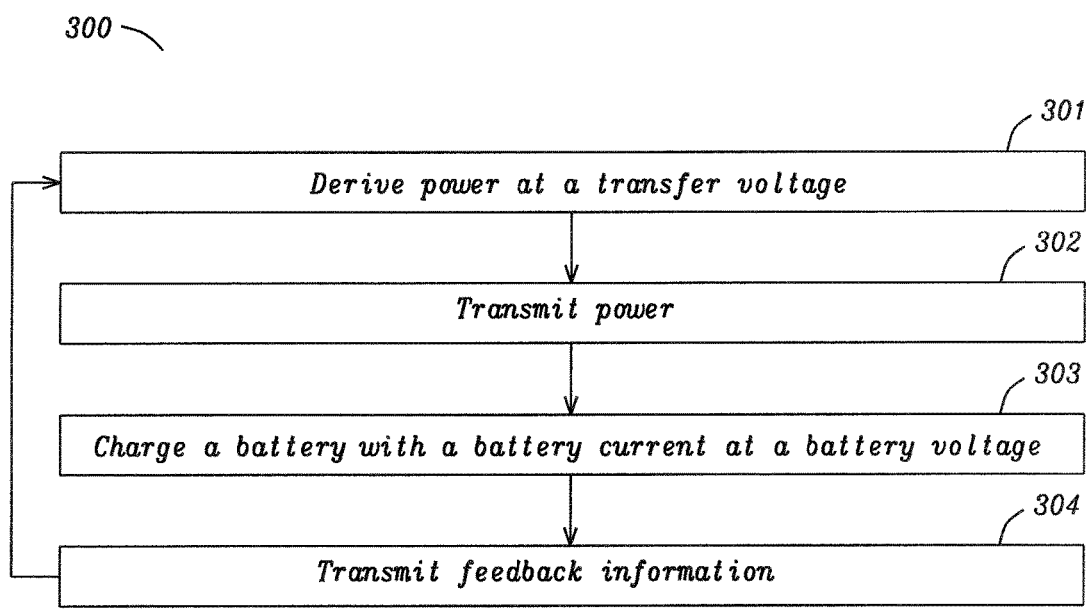
FIG. 3 shows a flow chart of an example method for charging a battery.

FIG. 3 shows a flow chart of an example method 300 for charging a battery 140 of an electronic device. The battery 140 may comprise one or more battery cells which may be arranged in series and/or in parallel. The battery cells may e.g. be implemented using LiIon technology. The electronic device may comprise a portable electronic device such as a smartphone or a tablet PC. The method 300 may be implemented using an adapter 110 and a battery charger 130, wherein the adapter 110 and the battery charger 130 are typically separate from one another.

The method 300 comprises deriving 301 power at a transfer voltage 121 from a power source (e.g. from a mains supply) using the adapter 110. The transfer voltage 121 is a DC voltage, wherein the power source may provide AC power at an AC voltage. The method 300 further comprises transmitting 302 the power at the transfer voltage 121 from the adapter 110 to the battery charger 130 (e.g. using a conductive charging cable or using wireless power transmission technology).

Furthermore, the method 300 comprises charging 303 the battery 140 of the electronic device with a battery current at a battery voltage 141, wherein the battery current is typically derived from the power at the transfer voltage 121 using the battery charger 130. In particular, a regulated battery current (e.g. regulated to a constant target charging current) may be provided for charging the battery 140. For this purpose, the battery charger 130 may comprise a current regulator 133 (referred to herein also as a charging unit).

The method 300 may further comprise transmitting 304 feedback information which is indicative of the battery voltage 141 from the battery charger 130 to the adapter 110. The transfer voltage 121 may then be set by the adapter 110 in dependence of the feedback information. In particular, the transfer voltage 121 may be regulated in dependence of the feedback information. By way of example, the transfer voltage 121 may be set (e.g. regulated) such that voltage step-down conversion which is required to be performed within the battery charger 130 to obtain the battery voltage 141 is an integer n that is equal to or greater than 1. In particular, a deviation between a target step-down conversion ratio n and an actual step-down conversion ratio may be determined. The transfer voltage 121 may be set (e.g. regulated) such that a magnitude of the deviation is reduced (e.g. minimized). As a result of this, power efficiency for charging the battery may be increased.

As can be seen in FIG. 3, the process of transmitting 304 feedback information and of deriving 301 power at the transfer voltage 121 based on the feedback information may be repeated in an iterative manner. In particular, a (continuous) regulation loop may be implemented.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A charging system for a battery of an electronic device, wherein the charging system comprises,
   an adapter configured to derive a transfer current at a transfer voltage from a power source;
   a battery charger configured to charge a battery of the electronic device with a battery current at a battery voltage using the transfer current at the transfer voltage; wherein the battery charger comprises a power converter;
   power transmission means configured to transmit the transfer current at the transfer voltage to the battery charger; and
   communication means configured to repeatedly transmit feedback information from the battery charger to the adapter; wherein the feedback information is indicative of the battery voltage and/or the battery current;
   wherein the adapter is configured to set the transfer voltage and/or the transfer current in dependence of the feedback information;
   wherein the adapter comprises a voltage regulator that is configured to form a regulation loop for regulating the battery voltage in dependence of the repeatedly transmitted feedback information, such that the battery voltage is regulated to a desired battery voltage using voltage step-down conversion with a conversion ratio of n performed by the power converter, with n being an integer equal to or greater than 1.

2. The charging system of claim 1, wherein
   the adapter and the battery charger are implemented in separate physical units, notably within separate integrated circuits; and
   the battery charger is implemented as part of the electronic device.

3. The charging system of claim 1, wherein the battery charger comprises a current regulator configured to regulate the battery current for charging the battery using the transfer current at the transfer voltage.

4. The charging system of claim 3, wherein
   the current regulator exhibits a regulator voltage drop; and
   the adapter is configured to set the transfer voltage also in dependence of the regulator voltage drop.

5. The charging system of claim 3, wherein
   the battery charger comprises a control unit configured to determine a target charging current;
   the current regulator is configured to derive the battery voltage in dependence of the target charging current.

6. The charging system of claim 1, wherein the power converter comprises a capacitive power converter.

7. The charging system of claim 1, wherein
   the power converter exhibits a converter voltage drop; and
   the adapter is configured to set the transfer voltage also in dependence of the converter voltage drop.

8. The charging system of claim 1, wherein the power transmission means comprise
   a charging cable or
   a wireless power transmission unit configured to generate an electromagnetic charging field using the transfer current at the transfer voltage; and
   a wireless power reception unit configured to derive power at the transfer voltage from the electromagnetic charging field.

9. The charging system of claim 1, wherein
   the battery charger comprises a transmission communication module configured to transmit the feedback information over a communication channel; and
   the adapter comprises a receiver communication module configured to receive the feedback information via the communication channel.

10. The charging system of claim 9, wherein the communication channel comprises
    an electrical wire of a charging cable which is used for conducting the transfer current at the transfer voltage from the adapter to the battery charger; or
    a radio frequency link.

11. The charging system of claim 1, wherein the adapter comprises a current regulator which is configured to regulate the transfer current in dependence of the feedback information, such that the battery voltage is derivable from the transfer voltage by the battery charger using voltage step-down conversion with a conversion ratio of n, with n being an integer equal to or greater than 1.

12. The charging system of claim 1, wherein the adapter may be configured to adapt the transfer voltage such that the transfer current does not exceed a pre-determined maximum transfer current; or adapt the transfer current such that the transfer voltage does not exceed a pre-determined maximum transfer voltage.

13. An adapter for charging system for charging a battery of an electronic device, wherein the adapter comprises,
   a receiver communication module configured to repeatedly receive feedback information which is indicative of a battery voltage and/or battery current to be used for charging the battery;
   a voltage regulator configured to derive a transfer current at a transfer voltage from a power source, in dependence of the feedback information;
   wherein the adapter comprises a voltage regulator that is configured to form a regulation loop for regulating the battery voltage in dependence of the repeatedly transmitted feedback information, such that the battery voltage is regulated to a desired battery voltage using voltage step-down conversion with a conversion ratio of n performed by the power converter, with n being an integer equal to or qreater than 1; and
   a power transmission interface for providing the transfer current at the transfer voltage over power transmission means to a battery charger for charging the battery.

14. A battery charger for charging a battery of an electronic device, wherein the battery charger comprises,
   a power reception interface for receiving a transfer current at a transfer voltage over power transmission means;
   a current regulator configured to regulate a battery current for charging the battery using the transfer current at the transfer voltage, wherein the battery current is to be provided at a battery voltage set to a desired battery voltage;
   a power converter configured to convert the transfer voltage into the battery voltage using voltage step-down conversion with a conversion ratio of n, with n being an Integer equal to or greater than 1; and
   a transmission communication module configured to repeatedly transmit feedback information indicative of the battery voltage and/or the battery current and the desired battery voltage over a communication channel.

15. A method for charging a battery of an electronic device using an adapter and a battery charger, wherein the adapter and the battery charger are separate from one another; the method comprising,
   deriving a transfer current at a transfer voltage from a power source using the adapter;
   transmitting the transfer current at the transfer voltage from the adapter to the battery charger;
   charging the battery of the electronic device with a battery current at a battery voltage, wherein the battery current is derived from the transfer current at the transfer voltage using the battery charger; and
   repeatedly transmitting feedback information which is indicative of the battery voltage from the battery charger to the adapter; wherein the transfer voltage and/or transfer current is set by the adapter in dependence of the feedback information;
   wherein the adapter comprises a voltage regulator that is configured to form a regulation loop for regulating the battery voltage in dependence of the repeatedly transmitted feedback information, such that the battery voltage is regulated to a desired battery voltage using voltage step-down conversion with a conversion ratio of n performed at the battery charger, with n being an integer equal to or greater than 1.

16. The method of claim 15, wherein
   the adapter and the battery charger are implemented in separate physical units; and
   the battery charger is implemented as part of the electronic device.

17. The method of claim 15, wherein the battery charger comprises a current regulator to regulate the battery current for charging the battery using the transfer current at the transfer voltage.

18. The method of claim 17, wherein
   the current regulator exhibits a regulator voltage drop; and
   the adapter sets the transfer voltage also in dependence of the regulator voltage drop.

19. The method of claim 17, wherein
   the battery charger comprises a control unit to determine a target charging current; and
   the current regulator derives the battery voltage in dependence of the target charging current.

20. The method of claim 15, wherein the power converter comprises a capacitive power converter.

21. The method of claim 15, wherein
   the power converter exhibits a converter voltage drop; and
   the adapter sets the transfer voltage also in dependence of the converter voltage drop.

22. The method of claim 15, wherein the power transmission means comprise
   a charging cable; and
   a wireless power transmission unit to generate an electromagnetic charging field using the transfer current at the transfer voltage; and
   a wireless power reception unit to derive power at the transfer voltage from the electromagnetic charging field.

23. The method of claim 15, wherein
   the battery charger comprises a transmission communication module to transmit the feedback information over a communication channel; and
   the adapter comprises a receiver communication module to receive the feedback information via the communication channel.

24. The method of claim 23, wherein the communication channel comprises
   an electrical wire of a charging cable which is used for conducting the transfer current at the transfer voltage from the adapter to the battery charger and/or
   a radio frequency link.

25. The method of claim 15, wherein the adapter comprises a current regulator to regulate the transfer current in dependence of the feedback information, such that the battery voltage is derivable from the transfer voltage by the battery charger using voltage step-down conversion with a conversion ratio of n, with n being an integer equal to or greater than 1.

26. The method of claim 15, wherein the adapter
   regulates the transfer voltage such that the transfer current does not exceed a pre-determined maximum transfer current; or
   regulates the transfer current such that the transfer voltage does not exceed a pre-determined maximum transfer voltage.

* * * * *